3,174,529
CONTROL SYSTEM
Robert A. Grosselfinger and Frederic E. Bolliger, Bethesda, Md., and Ernst A. Nussbaumer, Washington, D.C., assignors, by mesne assignments, to The Garrett Corporation, Los Angeles, Calif., a corporation of California
Filed May 31, 1960, Ser. No. 33,032
19 Claims. (Cl. 158—36)

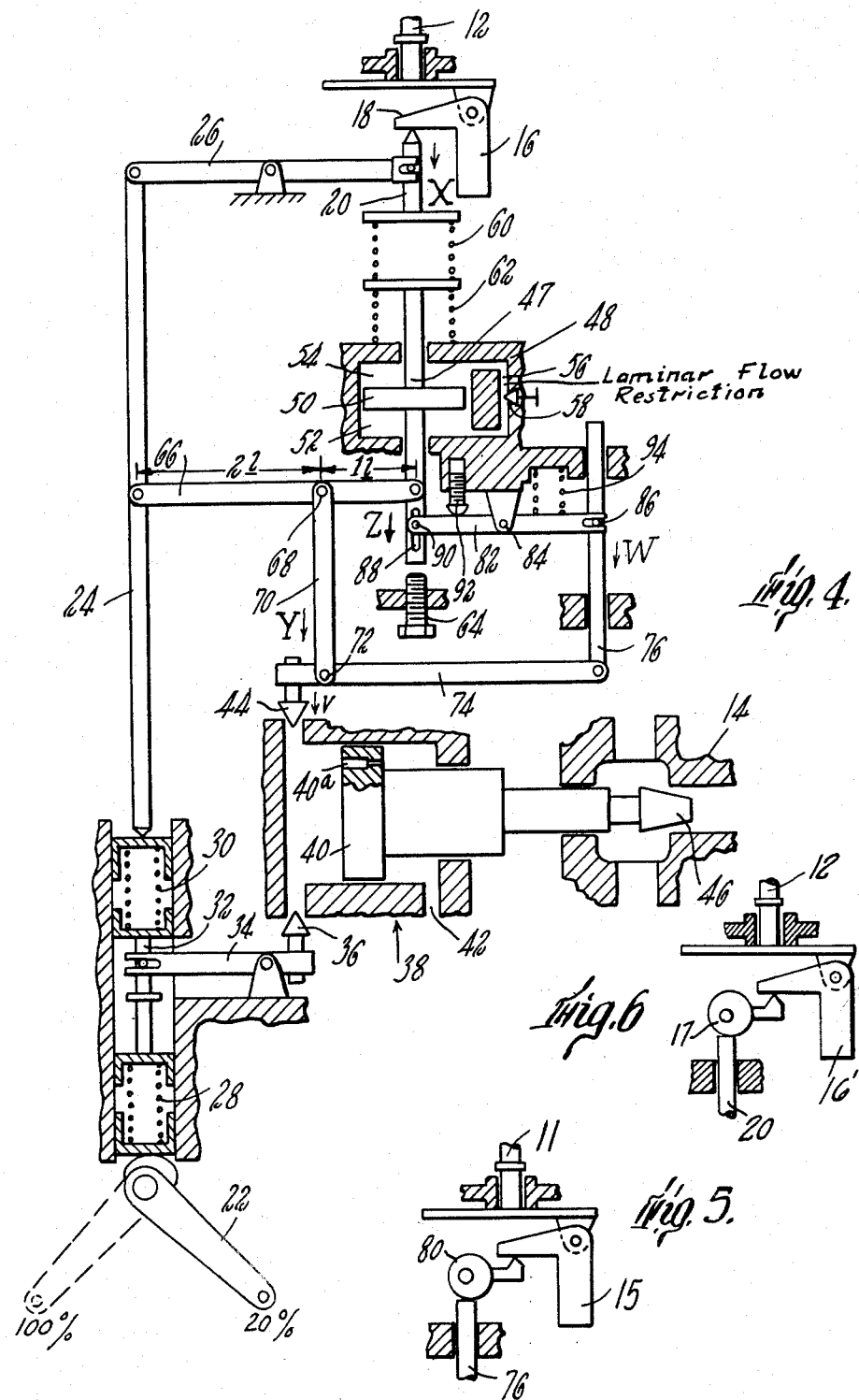

This invention relates to gas turbine control systems and the like and more particularly to such systems having novel hydro-mechanical means providing a close approximation to the mathematical derivative of its input.

In gas turbine power plant systems, the control of the gas turbine during power increasing transients has long been a problem because of the necessity of avoiding dangerously high turbine inlet temperatures as well as compressor surge while at the same time increasing the speed of the gas turbine as rapidly as possible. Heretofore, the solution to the problem has been by the provision of limiting devices, which limit some pertinent engine operating variable to a specific value or according to a certain operating schedule. The disadvantage of any such device is that the value to which the selected engine variable has been limited depends on such conditions as ambient temperature and pressure or fuel heating value or the like; unless such changes in ambient conditions are compensated. However, any device capable of doing this is complicated.

It is an object of the present invention to provide a gas turbine power plant control system which will permit control of a power increasing transient close to the high inlet temperature or compressor surge region even though the boundary of such region may not be a straight or simply curved line.

It is another object of the present invention to provide for increased efficiency of the turbine during power increase by permitting it to accelerate in a controlled manner closely along the line of high inlet temperature and compressor surge yet without enroaching thereupon, even though such line may have reversed curves therein.

It is still another object of the invention to provide a straightforward hydro-mechanical control system which will operate to control the turbine during power increases in a predetermined manner.

These and other objects of the invention have been accomplished by providing, in general, a control system having a speed sensor providing a turbine speed output signal, hydro-mechanical means for differentiating such output signal, and a turbine fuel control operated thereby as well as by other signals to whatever degree desired, including, for example, a simple speed or speed squared signal or by a signal related to the derived output or other signal and selectively applied to the fuel control. The novel hydro-mechanical differentiating means per se comprises a viscously damped spring element operated by a speed or speed squared displacement signal as from a flyball speed sensor to provide a mathematical first derivative of the signal input thereto. The invention is thus particularly useful in such cases wherein the computed derivative of a variable is desired, and, in the case of a gas turbine power plant system, of providing uncomplicated means for limiting transient fuel flow so as to avoid excessive turbine inlet temperatures and compressor surge during increases in power or load.

Various other objects and features of the invention will be apparent from the following description of preferred embodiments thereof, together with the accompanying drawings, wherein:

FIG. 4 is a diagrammatic drawing of the structure of the preferred embodiment of the invention;

FIG. 5 is a diagrammatic drawing of a modification of the structure of FIG. 4 and FIG. 6 is a diagrammatic drawing of another modification of the structure of FIG. 4.

Figure 1:
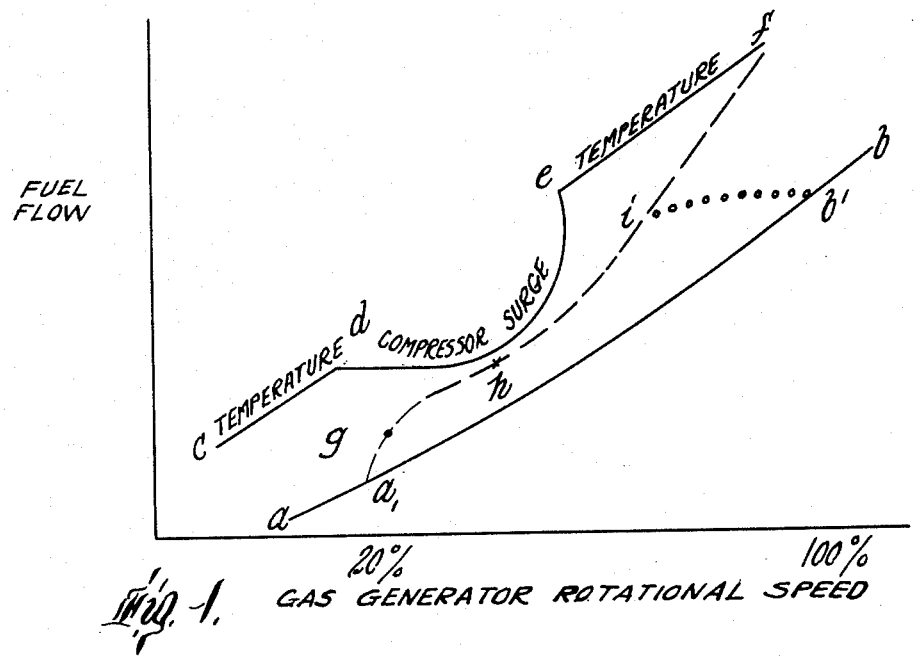
FIG. 1 is a graphical representation of typical gas turbine operation.

There are many gas turbine cycles to which this invention is applicable, but a gas turbine power plant system consisting of a gas generator and a free or power turbine driving a load will be used as illustrative of the invention. Furthermore, it will be assumed that the power lever controls directly the gas generator and there is no need to control the power turbine speed. Such a system, being well known in the art, need not be described herein. The gas generator characteristics of such a system are as shown in FIG. 1, such figure showing how a single steady state operating relationship exists between fuel flow and speed at a standard sea level day. Such relationship is shown by the curve $a$–$b$ of FIG. 1. As is generally so in cases involving a compressor driven by a turbine, an operational limiting relation exists as shown by $c$–$d$–$e$–$f$, where the sections $c$–$d$ and $e$–$f$ represent maximum permissible turbine inlet temperature and section $d$–$e$ is the compressor surge limiting relationship. It is essential that all changes in load or power along the line $a$–$b$ be accomplished without a combination of engine performance parameters such as to permit encroachment above the line $c$–$d$–$e$–$f$ during the course of the transient or change in load or power output.

Figure 2:
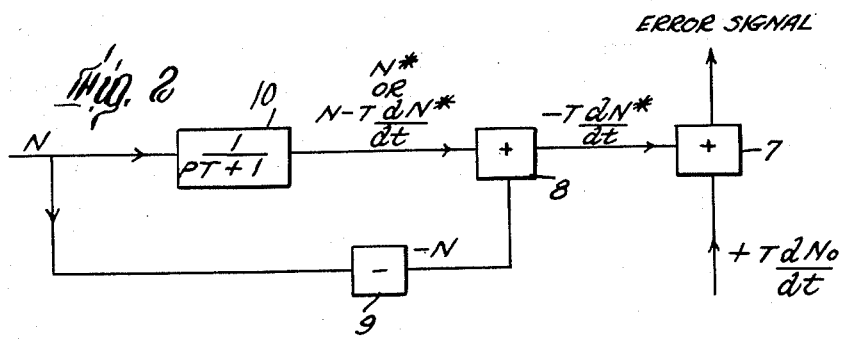
FIGS. 2 and 3 are block diagrams showing the operation modes of two embodiments of the invention.
Figure 3:
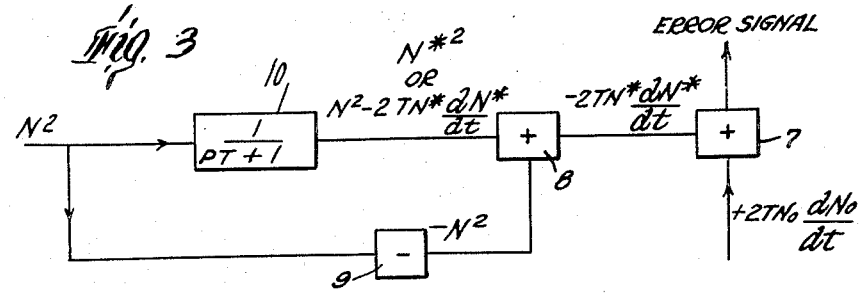

In general, the preferred embodiment of the invention described herein is a speed control which manipulates fuel flow to reduce to zero the error between desired and actual gas generator speed in conjunction with novel acceleration limiting means which effectively provides transient control in such a manner as to avoid exceeding the limiting relation of FIG. 1. The acceleration signal used for limiting turbine operation is computed by novel uncomplicated hydro-mechanical means, but before describing the structure of such means or the remainder of the system in which it operates, brief reference will first be made to the block diagram of FIG. 2. On the left side in that figure a signal proportional to turbine speed $N$ in the form of a displacement or otherwise from an appropriate sensor is introduced into a lag element represented by box 10. FIGS. 2 and 3 represent conventional block diagrams wherein the output is equal to the input times the quantity appearing in the box. Said quantity is herein referred to as the transfer function. The transfer function $$\left(\frac{1}{pT+1}\right)$$

of the lag element box 10 is shown therein and provides a simple first degree lag of the speed signal N. The significance of the term $$\left(\frac{1}{pT+1}\right)$$

is discussed in many control theory texts, for example, Process Instruments and Controls Handbook by Considine (McGraw-Hill, 1957) pages 11–49 and 11–55. The symbols $p$ and $T$ used herein correspond to $p$ and $T$ in that text, wherein $p$ is a symbol of the differential operator $d/dt$ whose units are (1/second), and the units for $T$ are (seconds). Let $N^*$ be the signal leaving lag element 10, which signal is equivalent to $N/pT+1$. Then since with the given transfer function of the lag element $$N = N^* + T(dN^*/dt)$$

that is $$N^* = N - T(dN^*/dt)$$

in which $T$ is the time constant of the lag element and $t$ the time. The same signal N goes to box 9 where its sign is inverted so that it becomes $-N$. This signal $-N$ out of box 9 is then added to the signal $N - T(dN^*/dt)$ in box 8. The output of box 8 is $-T(dN^*/dt)$ therefore proportional to the first derivative of $N^*$. Since for a small time constant $T$ there is a close resemblance between the signals $N^*$ and N it can be stated that the output of box 8 is approximately proportional to the first derivative of speed signal N. The signal leaving box 8 is compared to the desired acceleration $T(dN_0/dt)$ in box 7 which may be varied in accordance to some desired schedule and any error between desired and actual acceleration will provide an input signal to the control system, not shown, to change fuel flow.

In case the speed sensor provides a signal proportional to the square of the speed that is $N^2$, FIG. 3 applies. The signal proportional to the square of turbine speed $N^2$, is fed into a lag element shown by box 10, having a transfer function as shown. Let $N^{*2}$ be the signal leaving box 10 then since:

$$N^2 = N^{*2} + T(dN^{*2}/dt)$$

that is $$N^{*2} = N^2 - 2TN^*(dN^*/dt)$$

in which $T$ is again the time constant of the lag element and $t$ the time. The same signal $N^2$ also goes to box 9 where its sign is inverted. The signal $-N^2$ leaving box 9 is added in box 8 to the outgoing signal of box 10. The output of box 8 which is equal to $2TN^*(dN^*/dt)$ is compared with the desired value signal $2TN_0(dN_0/dt)$ in box 7. The desired signal $2TN_0(dN_0/dt)$ can be varied in accordance to some desired schedule.

In this second case the signal coming out of box 8 is also proportional to the first derivative of N but the proportionality factor depends on $N^*$, which is equal to $N/pT+1$ and is a close approximation of the speed N. This is a very useful characteristic which will be hereinafter discussed in some detail following a description of specific preferred structures capable of performing the transfer function operation shown in FIG. 3, as well as other functions, to provide a complete turbine power plant control.

Referring to FIG. 4, the gas turbine engine is represented by an output shaft 12 and a bypass fuel valve 14, but is otherwise so well known in the art as to require no description of its elements. The fuel which is not bypassed by valve 14 is fed to the combustion chamber where it is burned in the usual manner to rotate its elements and so turn an output shaft 12 at a speed which is related to the fuel input by the known characteristics of the gas turbine. The output shaft speed is translated into a linear displacement by means of a conventional speed sensor which may have either a linear or a square function but preferably having a square function. Such sensor includes a centrifugal force actuated weight 16 mounted on shaft 12 and having a bell crank arm 18 arranged for linear displacement of a main control rod 20 by a distance represented by the quantity X. In FIG. 6 is shown a linear function sensor having a cam 17 interposed to convert the square function output of its sensor 16' from shaft 12 to a linear function for input to rod 20. The linear displacement of the control rod 20 is transmitted to a conventional fuel control including a manually settable throttle 22 through an auxiliary control rod 24 by means of a rocking lever 26 having arms of equal length so that any displacement X of main rod 20 is equally transmitted to auxiliary rod 24 but in an opposite direction.

The fuel control operated by throttle 22 and auxiliary rod 24 consists of a pair of opposed spring elements 28 and 30 connected by a central rod 32, the throttle 22 operating lower spring element 28 to tend to compress it upon changing from a full throttle setting (100%) to a low throttle setting (20%) and the speed sensor auxiliary control rod 24 operating directly on upper spring element to compress it upon a speed decrease causing said rod 24 to move downward. In the embodiment herein shown, the springs 28, 30 are equivalent. The central rod 32 is connected by a rocking lever 34 to the valve element 36 of the fuel control servo valve generally designated 38, said servo valve having a piston 40 with an orifice 40a movable in a housing and having a source of fluid pressure 42 at one side thereof and outlet valve elements 36 and 44 on the other side thereof for movement of said piston in response to the position of valve elements 36 and 44. The piston 40 is connected to the valve element 46 of the gas turbine fuel valve 14 so that movement of the piston to the right as shown in the drawing as occurs upon the closing of valve elements 36 and 44 closes the element 46 against the bypass port of fuel valve 14 to increase fuel flow to the turbine to cause it to accelerate. The increased speed will be sensed by sensor 16 and transmitted through auxiliary control rod 24 to the spring elements 28, 30 to rock lever 34 and set valve element 36 in such a manner that the system reaches again balance. However, the above described conventional elements and system in no way define the transient operation during power changes.

The present invention is concerned with the elements and system now to be described which operates fuel valve element 44 in such a manner as to define a predetermined desired transient operation, as has been briefly described above and will be hereinafter described in more detail.

Returning to the speed sensor, preferably it is of a type wherein the square function is not removed, that is, the displacement X of rod 20 derived from the centrifugally actuated weight 16 operating against a spring system is proportional to the square of the speed of shaft 12, although in some circumstances a structure may be useful wherein the displacement X is directly proportional to speed. Too, in accordance with the principles of the present invention, the speed sensor is constructed and arranged with a hydro-mechanical differentiator effective to provide an output displacement Y which includes a first mathematical derivative of the displacement X, and hence may be said to include a function related to acceleration of the shaft 12, as will be hereinafter more fully explained. Structurally, the hydro-mechanical differentiator includes a differentiator rod 47 arranged on the same axis as is main control rod 20 but spaced therefrom, said rod 47 passing through a chamber within a housing 48 and having a piston 50 rigidly mounted therein within said chamber in effect providing a pair of chambers 52 and 54 connected by a passageway 56 having an adjustable laminar flow restriction 58 therein. A spring system is provided for the differentiator rod 47, including a spring 60 positioned between its end plate and that of main rod 20 and a spring 62 positioned between the end plate of differentiator rod 47 and a fixed point herein shown as housing 48. Springs 60 and 62 are equivalent with equal spring rates (K). An adjustable stop 64 is provided to limit the extent of movement of differentiator rod 47 in a direction away from sensor main rod 20.

The differentiator rod 47 does not directly operate the valve element 44 to control fuel flow to the turbine. Rather its output displacement is combined with the direct motion of sensor main rod 20 by connecting auxiliary rod 24 with differentiator rod 47 by means of a link 66 extending transversely between and pivotally mounted on said rods, the combined motion being taken off at a point 68 spaced between its ends two times as far from auxiliary sensor control rod 24 as from differentiator rod 47 by means of an adder control rod 70, the displacement of which may be defined as the function Y as is hereinafter more fully explained.

In the preferred embodiment of the present invention, the displacement Y of adder control rod 70 does not directly operate the valve element 44, but rather, said rod 70 is connected to an intermediate point 72 of a link 74 which carries at its one end said valve element 44 and at its other end is connected to a correction signal control rod 76 parallel to and spaced from link 70 so that link 74 extends transversely therebetween. Although the motion of correction signal control rod 76 might be produced by other means, such as by a cam 80 rotated by, for example, a gas turbine shaft speed sensor 15, driven by shaft 11 (FIG. 5), it is preferred to utilize a correction signal produced by the displacement of the differentiator control rod 47. This is accomplished in a unique manner by providing a rocking correction link 82 pivotally mounted generally centrally on housing 48 at 84, with its one end pivotally connected to correction signal control rod 76 at 86 and its other end connected to differentiator rod 47 by means of a slot 88 in said rod and a pin 90 on said lever. With the structure at rest, pin 90 is positioned as desired intermediate the ends of slot 88 by means of an adjustable stop 92 and a spring 94.

For the purpose of explaining the operation of the above described structure, let it be assumed that the gas generator is operating at 20% of its rated speed and that this is the initial steady state condition as indicated by the point $a_1$ on the line $a$–$b$ of FIG. 1. This initial steady state point is also shown by the throttle lever 22 setting in full lines in FIG. 4. If the lever 22 is moved to the 100% setting, the spring system made up of springs 28 and 30, which was previously in balance, is unbalanced with the connecting rod 32 being moved downward thereby tending to close the valve element 36 on the servo valve 38. The servo valve piston 40 then moves to the right in FIG. 4 closing the fuel bypass valve element 46 and thereby increasing the fuel flow to the turbine power plant gas generator causing it to accelerate. The increased gas generator speed appearing on shaft 12 causes the sensor 16 to compress the spring systems 60 and 62 lifting the auxiliary sensor control rod 24, thus moving connecting rod 32 until the system is again in balance with said connecting rod at its initial neutral steady state point and the gas generator at 100% speed. The above detailed transient describes the operation of the speed error segment of the fuel control.

The above described transient, however, in no way takes account of the gas generator limiting characteristics as defined by lines $c$–$d$–$e$–$f$ of FIG. 1, for which the remainder of the system, diagrammatically shown in FIGS. 2 and 3, is applicable. For the purposes of the following discussion, it may be assumed that the excess energy which must be supplied to a turbine power plant for acceleration is expressed in the form of fuel flow with limits as determined by maximum turbine inlet temperature and compressor surge (FIG. 1). In accordance with the principles of the present invention, such limits may also be expressed in the form of turbine acceleration, since the turbine inertias involved remain constant. Hence, if an actual turbine power plant acceleration is either measured or computed, it then becomes possible to control the transient within the expressed limits.

More particularly, in the specific embodiment described herein, acceleration is computed from a turbine power plant speed by hydro-mechanical means shown in FIG. 4, but which may be understood in a mathematical sense by reference to the block diagram of FIGS. 2 and 3. Referring to FIG. 2, a speed signal N available from sensor 16 is introduced to box 10 which box corresponds to said hydro-mechanical means. The output signal from box 10 is the input signal N times the transfer function of box 10, and is equivalent to $N/pT+1$. A signal N* is defined to be equivalent to $N/pT+1$. With a speed signal in the form of a displacement directly proportional to turbine speed the output would be N* or $N-TdN*/dt$ from which the input signal N is subtracted leaving a signal which is a very close approximation of the time constant times the derivative of the speed. This signal may then be compared to a desired acceleration, $Tdn_0/dt$ which may be varied in accordance with some desirable schedule. However, if as is preferred, a speed sensor is used where the square function is not removed, i.e., the displacement is proportional to the speed squared, then as may be seen in FIG. 3, the output of the time constant transfer function is N*² or $N^2-2TN*dN*/dt$ and the computed acceleration is proportional to N*. In the latter case the symbol N*² is by definition equal to $N^2/Tp+1$, where $N^2/pT+1$ is the input signal box 10 times the transfer function which box 10 represents.

It will now be shown how the functions shown in FIG. 3 are achieved by means of the structure shown on FIG. 4. Consider first housing 48 having a piston 50 mounted on differentiator rod 47. The force equilibrium on piston 50 may be expressed as:

$$(P_1-P_2)A_p+(X-Z)K_1=ZK_2 \qquad (1)$$

where:

$P_1$: Pressure in upper chamber 54 above piston 50 (p.s.i.)
$P_2$: Pressure in lower chamber 52 below piston 50 (p.s.i.)
$A_p$: Area of piston 50 (in.²)
X: Displacement of main control rod 20 (in.)
Z: Displacement of differentiator rod 47 (in.)
$K_1$: Rate of spring 60 (lbs./in.)
$K_2$: Rate of spring 62 (lbs./in.)

The flow of hydraulic fluid through the laminar flow restriction 58 of the by-pass valve 56 may be expressed by:

$$A_p(dZ/dt)=-R(P_1-P_2) \qquad (2)$$

where:

R: Resistance of flow through restriction 58 ((in.³/sec.)/(p.s.i.))
$t$: Time (sec.)
All other symbols are as defined in Equation 1.

In this derivation the resistance R is such as to impose laminar flow on the hydraulic fluid passing through it. It may be defined as:

$$R=D^4/40.8uL$$

where:

$u$=dynamic viscosity of fluid—lb./sec./in.²
$L$=length of resistance—in.
$D$=diameter of resistance—in.⁴
40.8=a constant in the regime where the length to diameter ratio of resistance and pressure difference across it is such that flow is laminar.

Combining Equations 1 and 2 by eliminating $(P_1-P_2)$ and substituting for T the expression $A_p{}^2/2RK$ and assuming each of $K_1$ and $K_2$ equal to K since in the embodiment of FIG. 4 the spring rates of springs 60, 62 are equal, provides:

$$Z=(X/2)-T(dZ/dt) \qquad (3)$$

Although the ideal solution to the problem would include the factor $dX/dt$ rather than $dZ/dt$, the approximation provided by the substitution of $dZ/dt$ for $dX/dt$ has proved to be a close and highly useful one, particularly as T is made smaller. Dimensionally, $Ap^2/2RK$ and T have the equivalent unit of seconds. This shows that housing 48 is a lag element like box 10 of FIGS. 2 and 3. The displacement Z of differentiator rod 47 has a lag with a time constant T with respect to the displacement X of main control rod 20. Therefore in case of a linear governor in which the displacement X of the speed sensor consisting of flyweight 16, driven by an input shaft 12 is proportional to speed, the variable X in the above equation is proportional to N and the displacement Z of rod 47 may be defined, as in block 10 of FIG. 2 to be proportional to the signal represented by the symbol N*.

The motion of main control rod 20 is transmitted to auxiliary control rod 24 by means of rocking lever 26. For a downward motion of main control rod 20 the auxiliary control rod 26 moves upward therefore rocking lever 26 can be compared to box 9 of FIG. 2 which inverts the sign of its incoming signal N to —N. Link 66 which connects auxiliary control rod 26 to differentiator rod 47 provides at point 68, to which rod 70, having a displacement Y, is linked, the summation of the displacements of auxiliary control rod 24 and differentiator rod 47 and is therefore comparable to box 8 of FIG. 2.

Due to the ratio 2 to 1 of the distances of rod 70 from auxiliary control rod 24 and differentiator rod 47, the following relationship exists between the displacements Z, X, and Y due to link 66:

$$Y = (2/3)Z - (1/3)X$$

or with Equation 3

$$Y = -(2/3)T(dZ/dt)$$

from which it is shown that the displacement Y of rod 70 is proportional to $$T \frac{dN^{*2}}{dt} \text{ or } 2TN^*\left(\frac{dN^*}{dt}\right)$$

Thus X, Y and Z of FIGS. 4 and 6 have been shown to be proportional to $N^2$, $N^{*2}$ and $$2TN^*\left(\frac{dN^*}{dt}\right)$$

of FIG. 3. The proportionality factors due to linkage ratios, speed governor and time constants may be defined by $$X = C_2 N^2$$

$$Z = \left(\frac{C_2}{2}\right) N^{*2}$$

$$Y = \left(\frac{C_2}{3}\right)\left[2TN^*\left(\frac{dN^*}{dt}\right)\right]$$

where $C_2$: speed governor constant (in./r.p.m.²)

In case of a linear governor where the displacement X of main control rod 20 is proportional to speed N, X, Y and Z of FIG. 4 are proportional to N, N* and $$T\left(\frac{dN^*}{dt}\right)$$

of FIG. 2. The proportionality factors due to linkage ratios, speed governor and time constants may be defined by $$X = C_1 N$$

$$Z = \left(\frac{C_1}{2}\right) N^*$$

$$Y = \left(\frac{C_1}{3}\right)\left(T\frac{dN^*}{dt}\right)$$

where:

$C_1$: speed governor gain (in./r.p.m.)

In any case, the measured acceleration out of box 8 of either FIGS. 2 or 3 is subtracted in box 7 from the desired acceleration and the difference is used to change the fuel flow.

In the structure of FIG. 4 rod 70 whose displacement Y is proportional to measured acceleration is connected to rod 76 whose displacement is proportional to desired acceleration W. The difference between the two displacements Y and W is provided as a displacement V of valve element 44 which influences the fuel by-pass valve.

The desired acceleration on rod 76 may be actuated as shown on FIG. 5 by a flyball speed sensor 15 driven from a shaft 11 through a cam 80 which acts on rod 76 or preferably by using a more sophisticated system such as shown on FIG. 4.

Returning now to the operation of the entire control system as shown in FIG. 4, assume an initial steady state at 20% speed with an upset introduced in the form of a throttle movement to 100% speed by means of lever 22. The positive speed error will close the pilot valve element 36, as has been previously discussed, and this valve will remain closed until immediately prior to the arrival of the turbine power plant at 100% speed.

Assume X is changing downward very slowly, then for every unit of change, Z will change down only ½ unit (assuming the spring 60 equals that of spring 62 and the movement is so slow that the dash pot produces no lag). Under these conditions, rod 24 will move 1 unit upward due to 26 being fulcrumed in the center. The change in Y will be zero, due to the left end of lever 66 moving up 1 unit and its right end moving down ½ unit, and since lever 70 is fulcrumed to lever 66 at the ⅓ point.

Now contrasting the situation where X is changing downwardly at a fast rate, then the dash pot will lag the change of Z so that Z no longer changes ½ unit for each 1 unit of change of X but a lesser amount. The amount less becomes of greater magnitude as the rate of change of X is greater due to the greater effect of the lag, since the amount of lag is a close approximation of the first derivative of the rate of change of X. This action is clearly of a nature to draw up rod 70, since the downward Z movement of rod 47 is not at sufficient rate to any longer just compensate for the up movement of rod 24 each action or opposite ends of lever 66. It is thus seen that since the greater rate of change of X represents a greater rate of change of speed (acceleration) the up movement of valve 44 is in a sense to limit the fuel flow so as to limit acceleration.

Returning to a more general discussion the correcting rocking lever 82 does not function at the beginning of the power increasing transient, because the pin 90 at the left end of the link is still free in the slot 88, being spaced between its ends as shown. The position of the point 86 or acceleration demand as expressed by the displacement W of correction rod 76 is therefore determined by the fixed stop 92, against which lever 82 is held by its spring 94.

The gas turbine power plant begins to accelerate because of the positive speed error acting to close the fuel bypass valve element 36 until such time as the actual acceleration, as computed, exceeds the demand or limiting acceleration determined by W which is initially a fixed value. As has been discussed, the computed acceleration signal minus $$2TN^*\frac{dN^*}{dt}$$

(FIG. 3) contains the factor N*, which increases in value with increasing engine speed, and therefore causes the relative value of $dN^*/dt$ to decrease with increased engine speed, if $$2TN^*\frac{dN^*}{dt}$$

is kept constant. If W the limiting signal (FIG. 4), proportional to $$+2TN_0\frac{dN_0}{dt}$$

(FIG. 3), is kept constant, the closed loop control will result in a transient of decreasing acceleration with increasing engine speed. For example, if at the beginning the gas generator was running at 20% of rated speed, and during the course of the upset it reaches 40%, then with the doubled speed the obtainable acceleration for zero error between measured and desired acceleration is only half of the original value. The transient therefore is of the nature of the curve $g$–$h$ of FIG. 1, and if allowed to continue to the 100% speed point, the acceleration at or about that point would be one-fifth of the initial acceleration since the gain of the computed acceleration is five times the original gain at 20% speed. This condition may be corrected for by providing a variable value of W as a function of speed or similar parameter through the use of a suitable cam, etc., as explained above.

However, it is preferred that a novel, highly effective means be used which takes cognizance of the inherent characteristic of a gas turbine power plant as shown in FIG. 1, by the limits expressed as line $c$–$d$–$e$–$f$, namely, a correction signal imposed at a selected point in the power increasing transient, as is provided by pin 90 in lever 82 operating in slot 88 in control rod 47. With this arrangement, at an appropriately selected speed corresponding to point H of FIG. 1, the pin 90 of the lever 82 comes into contact with the end of slot 88 as rod 47 moves away from rod 20, actuating lever 82 to rock it. The desired acceleration defined by point 86, that is, W, which has been fixed up to this point, from this point on becomes a variable as a function of $N^{*2}$. Since the limiting signal will thereafter increase as a function of $N^{*2}$ and the computed signal as a function of $N^*$, the overall effect is to have the permissible acceleration increase as a function of $N^*$. The character of the curve $h$–$i$ is therefore opposite in nature to that of the curve $g$–$h$ with the point $h$ arbitrarily and effectively selected by the dimensions of the slot 88 in the rod 47. The referred-to characteristics of the two curves with the ready selection of point $h$ lends itself ideally to the inherent nature of the turbine operating line $c$–$d$–$e$–$f$. If consideration is given to the fact that $c$–$d$–$e$–$f$ varies as a function of compressor inlet temperature and pressure, these variations may be readily included by appropriate sensors in conjunction with cams or the like to further vary point 86, that is, W, accordingly.

The operation of the control with respect to the steady state control elements has previously been made reference to. During a transient instigated by a change in throttle setting of from 20% to 100% speed for example, pilot valve element 36 remains closed because of the large steady state speed error imposed. The initial acceleration beginning at point $a_1$ of FIG. 1 is large and is defined by the stop 92. The increased gain in the computed derivative signal proportionally reduces the actual acceleration throughout the extent $g$ by control of pilot valve element 44 while valve element 36 remains completely closed. At a preselected speed, defined as point $h$ of FIG. 1, as established by the length of the slot 88, the limiting acceleration becomes corrected as a function of $N^{*2}$ while the computed acceleration continues to be corrected as a direct function of $N^*$. The result is such as to realize larger and larger accelerations with increased speed above point $h$ of FIG. 1 for which the nature of all such curves emanating from point $h$ can be varied by the lever ratio involved in rocking lever 82.

When desired speed $b_1$ is nearly reached as at point $i$, valve element 36 will open, tending to decrease fuel flow, which in turn will prevent the scheduled acceleration from being accomplished. Valve element 44 will therefore close and remain closed during steady state operation with valve element 36 being adjusted at its neutral steady state position ($b_1$).

It may be seen from the foregoing that by very simple and novel means, those characteristics of a gas turbine constituting limits of safe operation may be effectively subscribed to a high degree of flexibility permitting its application to many gas turbine type configurations. This is made possible by utilization of a general physical phenomena, acceleration, rather than the careful definition of fuel flow which is unique between engine types and models. Various modifications of the invention within the spirit thereof and the scope of the appended claims will occur to those skilled in the control art.

We claim:

1. In a gas turbine power plant control system or the like, the combination of speed sensing means providing a turbine speed output signal, differentiating means for differentiating said turbine speed output signal to provide a computed signal which is an approximation to a mathematical derivative thereof, that is, a computed acceleration plus a factor including a speed component proportional to said speed output signal, said differentiating means including input means mounted for displacement proportional to said turbine speed output signal and output means mounted for displacement responsive to the displacement of said input means and coupled to said input means by elastic means, said output means being viscously damped to provide said computed signal which includes an approximate differential of the displacement of said input means plus a factor including a speed component proportional to said turbine speed output signal, adder means combining the displacement of said input means and the output of said output means to substantially eliminate said component to provide another signal which includes a close approximation of the differential of the speed output signal or computed acceleration, correction means for establishing a desired signal including a desired mathematical derivative, comparison means for comparing said other signal including said computed derivative with said desired signal including said desired derivative to provide an error signal, and turbine fuel control means operated by said comparison means responsive to said error signal to limit power plant acceleration during a power increase.

2. In a gas turbine power plant control system or the like, the combination of speed sensing means providing a turbine speed output signal, differentiating means for differentiating said turbine speed output signal to provide a computed signal which is an approximation to a mathematical derivative thereof, that is, a computed acceleration, plus a factor including a speed component proportional to said speed output signal, said differentiating means including input means mounted for displacement proportional to said turbine speed output signal to be differentiated and output means mounted for displacement responsive to the displacement of said input means and coupled to said input means and to a stationary element by elastic means, said output means being damped by a piston mounted thereon operating in a fluid chamber having a restriction extending between opposite sides of said piston to provide an output displacement including an approximate differential of the displacement of said input means plus a factor including a speed component proportional to said turbine speed output signal, adder means combining the displacement of said input means and the output means to substantially eliminate said component to provide another signal including a close approximation of the differential of the speed output signal or computed acceleration, correction means for establishing a desired signal including a desired acceleration, comparison means for comparing said other signal including said computed acceleration with said desired signal including said desired acceleration to provide an error signal, and turbine fuel control means operated by said comparison means responsive to said error signal to limit power plant acceleration during a power increase.

3. In a gas turbine power plant control system as claimed in claim 2 wherein said speed sensing means provides an output displacement proportional to the square of turbine speed.

4. In a gas turbine power plant control system as claimed in claim 2, wherein said correction means is connected to said output means to vary said desired acceleration responsive to displacement of said output means.

5. In a gas turbine power plant control system as claimed in claim 2, further including turbine speed control means effective to maintain turbine speed in the absence of control by said differentiating means.

6. In a gas turbine power plant control system or the like, the combination of speed sensing means providing a turbine speed squared output signal, differentiating means for differentiating said turbine speed squared output signal to provide a computed signal which includes an approximate mathematical derivative thereof, that is, a computed acceleration multiplied by a speed component derived from said turbine speed output signal plus a factor including a speed component proportional to said turbine speed output signal, said differential means including input means mounted for displacement proportional to the speed squared signal to be differentiated and output means mounted for displacement responsive to the displacement of said input means and coupled to said input means by elastic means, said output means being viscously damped to provide an output including an approximate differential of the displacement of said input means plus a factor including a speed component proportional to said turbine speed squared output signal, adder means combining the displacement of said input means and the output means to substantially eliminate said component to provide a computed output signal including a close approximation of the differential of the speed squared output signal or computed acceleration, correction means for establishing a desired signal including a desired acceleration, comparison means for comparing said computed signal with said desired signal including said desired acceleration to provide an error signal, and turbine fuel control means operated by said comparison means responsive to said error signal to limit power plant acceleration during a power increase.

7. In a gas turbine power plant as claimed in claim 6 wherein said desired signal increases as a squared speed function while said computed output signal increases as a simple speed function providing an increasing acceleration with increasing speed.

8. In a gas turbine power plant as claimed in claim 6, further including turbine speed control means operated by said speed sensing means effective to maintain turbine speed at a predetermined value, said speed control means having manually settable means for establishing a desired turbine speed and maintaining said speed by operating said turbine fuel control means after transient operation thereto as controlled by said differentiating, correction and comparison means.

9. In a gas turbine power plant control system or the like, the combination of speed sensing means providing a turbine speed squared output signal, differentiating means for differentiating said turbine speed squared output signal including input means mounted for displacement proportional to the speed squared signal to be differentiated, output means mounted for displacement responsive to the displacement of said input means and coupled to said input means and to a stationary element by elastic means, said output means being damped by a piston mounted thereon operating in a fluid chamber having a laminar flow restriction extending between opposite sides of said piston to provide an output including an approximate differential of the displacement of said input means and adder means combining the displacement of said input means and the output of said output means to substantially eliminate said input signal to provide a close approximation of the differential of the displacement of said input signal, correction means for establishing a desired acceleration connected to said output means to vary said desired acceleration only after an initial predetermined displacement of said output means, said delayed desired acceleration signal as a squared speed function while said computed acceleration increases as a simple speed function providing an increasing acceleration with increasing speed after said initial displacement, comparison means for comparing said computed signal with said desired acceleration to provide an error signal, and turbine fuel control means operated by said comparison means responsive to said error signal to limit power plant acceleration during a power increase.

10. In a gas turbine power plant as claimed in claim 9 wherein said speed sensing means comprises centrifugally operated weight means rotated by a shaft of said turbine and providing a linear displacement proportional to the square of the speed of said shaft.

11. A differentiator comprising input means mounted for linear displacement proportional to a variable to be differentiated, output means mounted for linear displacement responsive to the displacement of said input means coupled to said input means and to a stationary element by spring means, said output means being damped by a piston mounted thereon operating in a fluid chamber having a restriction extending between opposite sides of said piston to provide an output including an approximate differential of the displacement of said input means, and adder means combining the linear displacement of said input means and the output of said output means to substantially eliminate said input signal to provide a displacement including close approximation of the differential of the displacement of said input signal.

12. A system as claimed in claim 2 wherein said restriction is a laminar flow restriction.

13. In a gas turbine power plant control system or the like, the combination of speed sensing means providing a turbine speed output signal, differentiating means for differentiating said output signal to provide a computed signal of a useful approximation to a mathematical derivative of said speed output signal including a computed acceleration, comprising means providing a transfer function including viscous damping means having a fluid restriction, means for multiplying said transfer function times said speed output signal, and means for subtracting said speed output signal from said transfer function times said speed output signal, comparison means for comparing said computed signal including computed acceleration to a desired signal including desired acceleration and turbine fuel control means operated by said comparison means to limit the acceleration of said turbine substantially in accordance with said desired acceleration.

14. A system as claimed in claim 13 wherein said restriction is a laminar flow restriction.

15. In a gas turbine power plant control system or the like, the combination of speed sensing means providing a turbine speed output signal, differentiating means for differentiating said output signal to provide a computed signal which is an approximation to a mathematical derivative thereof, that is, a computed acceleration plus a factor including a speed component proportional to said speed output signal, means for subtracting an equivalent component proportional to said speed output signal to provide another factor including said computed acceleration, comparison means for comparing said other factor including said computed acceleration to a desired factor including a desired acceleration and turbine fuel control means operated by said comparison means to limit the acceleration of said turbine substantially in accordance with said desired acceleration.

16. A system as claimed in claim 15 wherein said turbine speed output signal is a squared function of turbine speed.

17. A system as claimed in claim 15 wherein said turbine speed output signal is a linear function of turbine speed.

18. In a gas turbine power plant control system or the like as claimed in claim 15 wherein said desired factor is scheduled in accordance with a predetermined schedule.

19. In a gas turbine power plant control system or the like as claimed in claim 18 wherein said predetermined schedule is at least partly established by said speed sensing means.

References Cited in the file of this patent

UNITED STATES PATENTS

| | | |
|---|---|---|
| 1,432,375 | Witt | Oct. 17, 1922 |
| 2,020,847 | Mitereff | Nov. 12, 1935 |
| 2,261,343 | De Florez et al. | Nov. 4, 1941 |
| 2,633,830 | McCourty et al. | Apr. 7, 1953 |
| 2,670,599 | Davies et al. | Mar. 2, 1954 |
| 2,946,188 | Eastman | July 26, 1960 |
| 2,949,957 | Eastman | Aug. 23, 1960 |
| 2,961,767 | Schiff | Nov. 29, 1960 |
| 2,971,338 | Bodemuller | Feb. 14, 1961 |

UNITED STATES PATENT OFFICE
CERTIFICATE OF CORRECTION

Patent No. 3,174,529                      March 23, 1965

Robert A. Grosselfinger et al.

It is hereby certified that error appears in the above numbered patent requiring correction and that the said Letters Patent should read as corrected below.

Column 1, line 41, for "enroaching" read -- encroaching --; column 6, line 19, for "$Tdn_o/dt$", in italics, read -- $TdN_o/dt$ --, in italics; column 8, line 18, after "state" insert -- point -

Signed and sealed this 23rd day of November 1965.

SEAL)
Attest:

ERNEST W. SWIDER
Attesting Officer

EDWARD J. BRENNER
Commissioner of Patents